US005424107A

United States Patent [19]

Lee

[11] Patent Number: 5,424,107

[45] Date of Patent: Jun. 13, 1995

[54] REINFORCED CORNER STRUCTURE FOR CLOTH

[75] Inventor: Young S. Lee, Seoul, Rep. of Korea

[73] Assignee: Kyoha Industrial Co., Ltd., Kyoung, Rep. of Korea

[21] Appl. No.: 144,441

[22] Filed: Nov. 2, 1993

[30] Foreign Application Priority Data

May 15, 1993 [KR] Rep. of Korea ........................ 93-8166

[51] Int. Cl.$^6$ .................................................. B32B 3/10

[52] U.S. Cl. .......................................... 428/80; 428/99; 428/137

[58] Field of Search .................... 428/80, 99, 131, 137; 52/3, 4; 150/52 R

[56] References Cited

U.S. PATENT DOCUMENTS 4,777,071 10/1988 Liu .

*Primary Examiner*—Alexander S. Thomas
*Attorney, Agent, or Firm*—Oblon, Spivak, McClelland, Maier & Neustadt

[57] ABSTRACT

A reinforced corner structure for cloth, especially a tent, capable of enabling the cloth corner to endure the dragging force coming from a cord installed therein and tied at a support and thus prolonging the life of the cloth. This reinforced corner structure comprises upper and lower plates For covering the upper and lower surfaces of the corner and reinforcing this corner. These upper and lower plates are integrally formed by a single injection molding of plastic material each other and each of them is an equilateral trapezoid in figure. This trapezoidal structure is opened at two sides but closed at the two other sides thereof, thereby allowing a cloth corner to be adjusted therein and preventing the corner of cloth from jutting out of the structure after the corner structure is fixed to the corner of cloth.

1 Claim, 2 Drawing Sheets

REINFORCED CORNER STRUCTURE FOR CLOTH

BACKGROUND OF THE INVENTION

1. Field of the Invention

The present invention relates in general to a reinforcement for cloth, and more particularly to a reinforced corner structure for cloth, especially a tent, capable of enabling the cloth corner to endure the dragging force coming from a cord installed therein and tied at a support and thus prolonging the life of the cloth.

2. Description of the Prior Art

In general, woven cloth, which is textured with warp and weft is apt to be ravelled at the corner thereof. Conventionally, in order to prevent the warp and weft of the corner from loosening, the edges of the woven cloth are usually folded for being stitched to form reinforcing portions. In the case of plastic cloth and canvas for various tents and covers that are always stretched by force to maintain their inherent shapes, for the purpose of avoiding ravelling at cloth corners, the corner edges of the woven cloth are folded over and stitched thereat with an annular opening provided in the corner and a grommet fixed therein for allowing a cord to be inserted into the grommet and tied at a support. However, as the opening deforms the warp and weft structure of the cloth, when the grommets are under stress, the environs of the opening will to be ravel led and ultimately break loose. For example, a tent is pitched with the aid of a plurality of tent poles and ropes in such a manner that it is set up by erecting the tent poles, stretching ropes connected to individual corners of the tent and tying these ropes to tent pegs. In order to connect the ropes to the corners of the tent, the tent is generally provided at its corners with annular rope openings which are reinforced with grommets, preferably made of metal or plastic materials. However each of the ropes is always stretched in a direction in order to maintain the stretched shape of the tent, the grommet is pulled in the same direction and this causes the woven cloth in the vicinity of annular rope opening to be deformed and ravelled. In this regard, this type of rope opening has a disadvantage in that the reinforcing grommet provided at the rope opening easily comes off.

In an effort to solve this problem, U.S. Pat. No. 4,777,071 proposed a stitchless reinforced corner structure for cloth. As proposed in this U.S. patent, a foldable reinforced corner structure is provided at a corner of woven cloth for preventing the warp and weft of the cloth from being deformed and disentangled. In application, this corner structure is added on a bottom surface of the corner of the woven cloth, and thereafter, folded at both flaps thereof to cover an upper surface of the corner in such a manner that two rope openings of the structure overlap with the corresponding opening of the cloth. In this state, a conventional reinforcing grommet is attached to the overlapped opening.

This corner structure, while somewhat preventing the grommet from coming off, nevertheless has a disadvantage in that it has the folding structure, which causes anxiety as to it becoming released under a possibly excessive load, and requires separate reinforcing grommets, thereby reducing productivity.

SUMMARY OF THE INVENTION

For solving the above problems, the present inventor has recognized that there exists a need for a structure to reinforce a corner of cloth, capable of increasing the useful life of cloth with great stability and security.

Accordingly, in an aspect of the present invention, there is provided a reinforced corner structure for cloth, in which the above disadvantages can be overcome and which reinforces the corner of cloth with no stitching and has increased strength as well as permitting improved productivity.

According to another aspect of the present invention, there is provided a reinforced corner structure for cloth, whereby, as a cord is situated in a corner of the cloth and subjected to the force necessary to maintain the inherent shape thereof, the force of the cord is evenly distributed so as to prolong the life expectancy of the cloth.

According to a further aspect of the present invention, there is provided a reinforced corner structure for cloth, which is structured such that the cloth is easily adjusted in position to closely engage itself therewith.

In a preferred embodiment of this invention, the above objects can be accomplished by providing a reinforced corner structure for cloth comprising an upper plate and a lower plate for covering the upper and lower surfaces of the corner respectively to reinforce this corner. These upper and lower plates are integrally formed by a single injection molding of plastic material and each of the plates is an equilateral trapezoid in shape. This trapezoidal structure is opened along two sides but closed along two sides or edges 30, 31 thereof, thereby allowing a cloth corner to be adjustably positioned therein and preventing the corner of cloth from jutting out of the structure after the corner structure is fixed to the corner of cloth.

Each of the upper and lower plates has an opening for being fitted with a grommet into which a cord is inserted to be subjected to pulling and dragging forces, and a pair of orifices are respectively provided in left and right sides of the opening for being closely engaged so as to tightly secure the cloth corner in position.

The above and other objects and advantages of the present invention will become more apparent as the following description proceeds.

To the accomplishment of the foregoing and related ends, the invention, then, comprises the features hereinafter fully described in the specification and particularly pointed out in claims, the following description and the annexed drawing setting forth in detail a certain illustrative embodiment of the invention, this being indicative, however, of but one of the various ways in which the principles of the invention may be employed.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DESCRIPTION OF THE PREFERRED EMBODIMENTS

Figure 1:
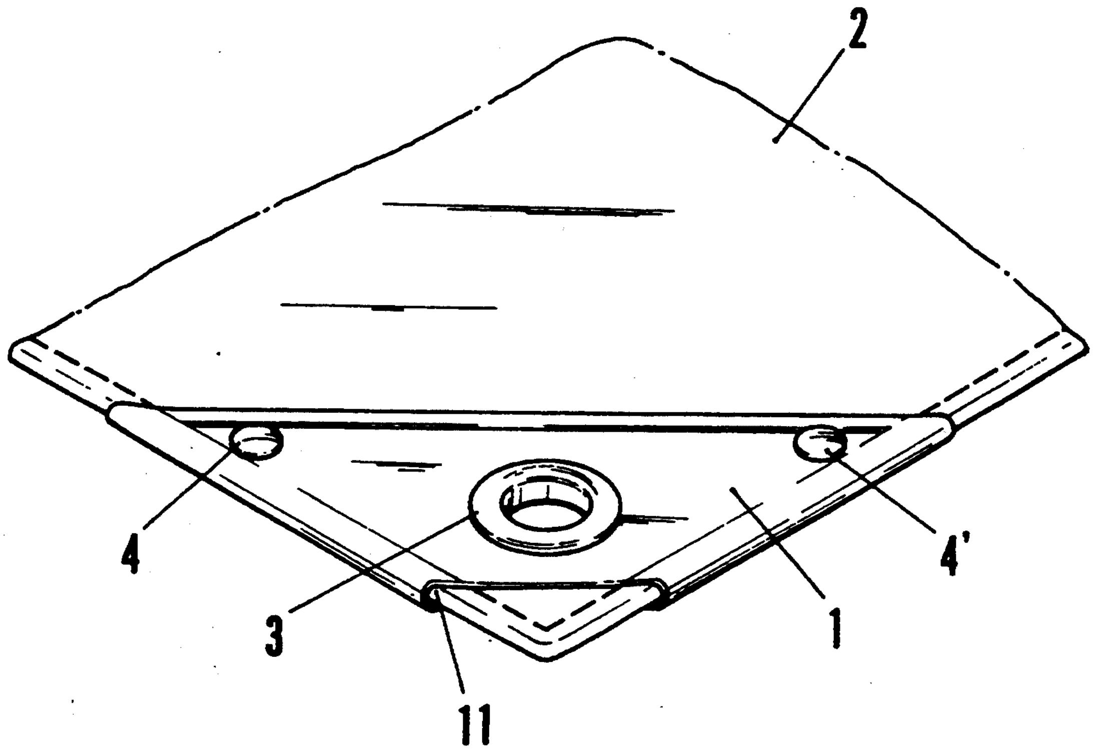
FIG. 1 is an illustrative view of the preferred embodiment according to the present invention used on cloth.

Hereinafter, preferred embodiment of the invention will be described in detail with reference to the drawings, and initially to FIG. 1, wherein there is illustrated a preferred interlining member used on cloth. The interlining member 1 according to the present invention is formed of tough plastic material by a single injection molding. A slit 11 forming a subtense of the equilateral trapezoidal figure in the interlining member 1 has such a function that it is capable of adjusting the fixing positions between the interlining member 1 and cloth 2. An annular opening is provided in the center position of the interlining member 1 for being fitted with a grommet 3 which is to be subjected to pulling and dragging forces through a cord inserted thereunto and tied at a support. A pair of orifices for snaps 4 and 4' respectively are formed in left and right sides of the opening for being closely engaged to tightly secure the cloth corner in position.

Figure 2:
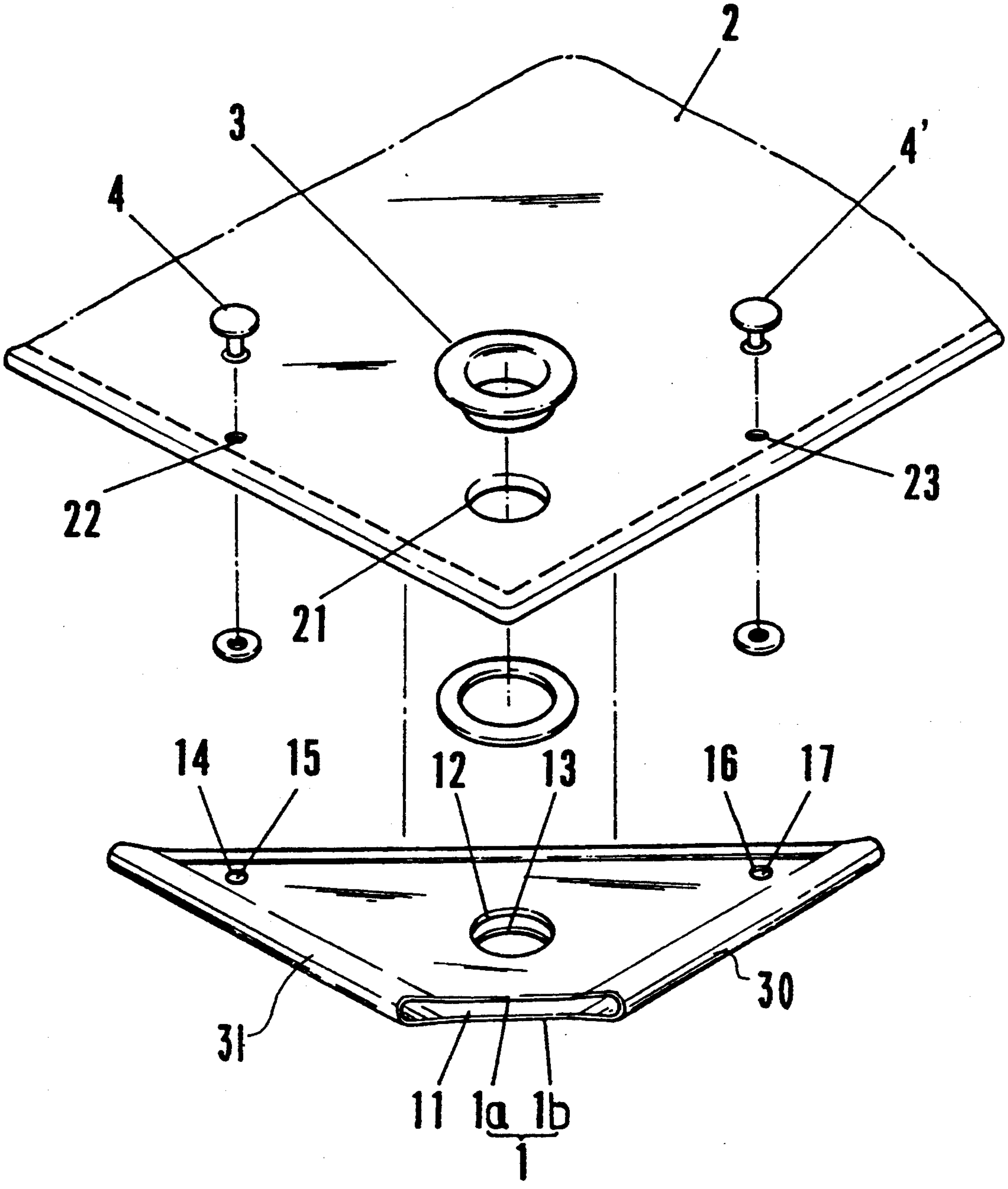
FIG. 2 is a perspective view of the preferred embodiment according to the present invention separated from the cloth.

Turning now to FIG. 2, there is shown the preferred embodiment separated from cloth. A description is given in detail hereinbelow for making use of the interlining member according to the present invention in order to to reinforce the corner of cloth.

A reinforced corner structure 1, which is integrally formed of tough plastic material, consists of two plates, an upper plates 1*a* and a lower plates 1*b*, having a slit 11 defined between the two plates. Annular openings 12 and 13 are respectively provided in a central portion of the upper plate 1*a* and the lower plate 1*b*, in which a grommet 3 including a lip is fitted. A pair of orifices 14 and 16 are respectively formed in left and right sides of the opening 12 on the upper plate 1*a*. Correspondingly, the lower plate 1*b* has a pair of orifices 15 and 17. Now, there is given the following description that the reinforced corner structure according to the present invention is utilized on cloth. In order to avoid raveling at the cloth corner, the cloth 2, which is woven with warp and weft, as usual, require a reinforced stitched portion along with the adjacent edges of its corner with a round opening 21 provided at a proper place in the cloth 2 for fitting a grommet 3 therein. The opening 21 corresponds in size with that of the annular openings 12 and 13. Two stubs 22 and 23 corresponding to the orifices 14 and 16 are positioned in left and right sides of the round opening 21 on the cloth 2. The corner of the cloth 2 is inserted between the upper and lower plates 1*a* and 1*b* of the interlining member, such that the orifices 14, 15 and the stub 22, and the orifices 16, 17 and the stub 23 are closely engaged with each other as well as the annular openings 12, 13 of the interlining member and the opening 21 of the cloth 2 is in exact alignment.

It shall be understood that the slit 11 defined between the upper plate 1*a* and the lower plate 1*b* allows the cloth corner to be easily adjusted in position therein in conjunction with the openings 12 and 21, and the orifices 14, 16 and the stubs 22 and 23. Thereafter, the grommet 3 including lip is fitted in the superposed openings 12, 13 and 21 to be interlocked with an O-ring by pressing the lip. In the meanwhile, a snap 4 is interlocked with its own O-ring through the stub 22 interposed between the orifices 14 and 15 so as to fasten the cloth corner in the interlining member. This is also true of the other snap 4'. Namely, the cloth corner is additionally fastened in the reinforced corner structure according to the present invention through the snap 4' penetrating the superposed openings 16, 17 and 23, which is interlocked with its own O-ring, as well.

As described hereinbefore, since the grommet 3 is fixedly fastened on the annular openings 12 and 13 of the interlining member, the dragging force, which may be necessary to form the inherent shape of the cloth, coming from the cord tied through the grommet 3 will not be directly applied to the opening 21 of the cloth 2. Therefore, there occurs no loosening, caused by the force, of the warp and weft of the cloth corner and thus the grommet 3 will not bolt off. Furthermore, the reinforced corner structure is advantageous in that it is capable of evenly dispersing the dragging force and supporting the tensile strength of the cloth with great stability.

Although the preferred embodiments of the present invention have been disclosed for illustrative purposes, those skilled in the art will appreciate that various modifications, additions and substitutions are possible, without departing from the scope and spirit, of the invention as disclosed in the accompanying claims.

What is claimed is:

1. A reinforced corner structure for being secured to a cloth article, which comprises:

an interlining member integrally formed by injection molding of a plastic material, which includes an upper plate and a lower plate, said upper plate and said lower plate being in the shape of an equilateral trapezoid wherein the upper and lower plates are connected by a first pair of opposite edges wherein a second set of opposite edges define a slit therebetween for allowing a cloth corner to be positioned therein, each of said plates having an opening and a pair of orifices respectively provided in the upper plate on opposite sides of the opening for allowing the cloth corner to be secured in the interlining; and a grommet positioned in said opening of each of said plates.

* * * * *